(12) United States Patent
Xie

(10) Patent No.: US 6,373,604 B1
(45) Date of Patent: Apr. 16, 2002

(54) OPTICAL MUX/DEMUX

(75) Inventor: Ping Xie, San Jose, CA (US)

(73) Assignee: New Focus, Inc., Santa Clara, CA (US)

( * ) Notice: Subject to any disclaimer, the term of this patent is extended or adjusted under 35 U.S.C. 154(b) by 0 days.

(21) Appl. No.: 09/473,774

(22) Filed: Dec. 29, 1999

Related U.S. Application Data

(60) Provisional application No. 60/157,265, filed on Oct. 1, 1999, provisional application No. 60/166,609, filed on Nov. 19, 1999, provisional application No. 60/168,148, filed on Nov. 29, 1999, provisional application No. 60/170,452, filed on Dec. 13, 1999, and provisional application No. 60/172,741, filed on Dec. 20, 1999.

(51) Int. Cl.[7] .......................... H04J 14/02; H04J 14/00; H04J 14/06; H04B 10/20
(52) U.S. Cl. ...................... 359/124; 359/115; 359/118; 359/122; 359/125
(58) Field of Search ................................ 359/124, 123, 359/113, 115, 118, 122, 125, 127, 138

(56) References Cited

U.S. PATENT DOCUMENTS

| | | | |
|---|---|---|---|
| 4,094,581 A | | 6/1978 | Baldwin et al. ............. 350/150 |
| 4,685,773 A | | 8/1987 | Carisen et al. .............. 350/401 |
| 4,813,761 A | * | 3/1989 | Davis et al. ............ 350/162.15 |
| 4,987,567 A | | 1/1991 | Buhrer .......................... 370/3 |
| 5,606,439 A | | 2/1997 | Wu ............................. 349/117 |
| 5,694,205 A | | 12/1997 | Gualtieri et al. .............. 356/33 |
| 5,694,233 A | | 12/1997 | Wu et al. .................... 359/117 |
| 5,867,291 A | * | 2/1999 | Wu et al. .................... 359/124 |
| 6,005,697 A | * | 12/1999 | Wu et al. .................... 359/117 |
| 6,208,444 B1 | * | 3/2001 | Wong et al. ................. 359/127 |

* cited by examiner

*Primary Examiner*—Jason Chan
*Assistant Examiner*—M. R. Sedighian
(74) *Attorney, Agent, or Firm*—Charles C. Cary; Cary & Kelly, LLP

(57) ABSTRACT

A method and apparatus for multiplexing/de-multiplexing optical signals is disclosed. The disclosed devices do not require active components. The devices may be used on their own or as part of a larger system such as a multi-stage mux/demux, an optical switch, or router. The optical device includes a linear polarizer, wave plates and a beam displacer/combiner. The wave plates optically couple to the linear polarizer. The wave plates rotate both odd and even channel components of an optical beam between a linear and an orthogonal relationship depending on the propagation direction. Each wave plate has a selected length and index of refraction determinative of a free spectral range which correspond to a spacing between adjacent gridlines of the selected wavelength grid. Each of the wave plates is tuned to even symmetry with the selected wavelength grid. The beam displacer/combiner displaces and combines orthogonally polarized odd and even channel components of an optical beam depending on a propagation direction.

30 Claims, 12 Drawing Sheets

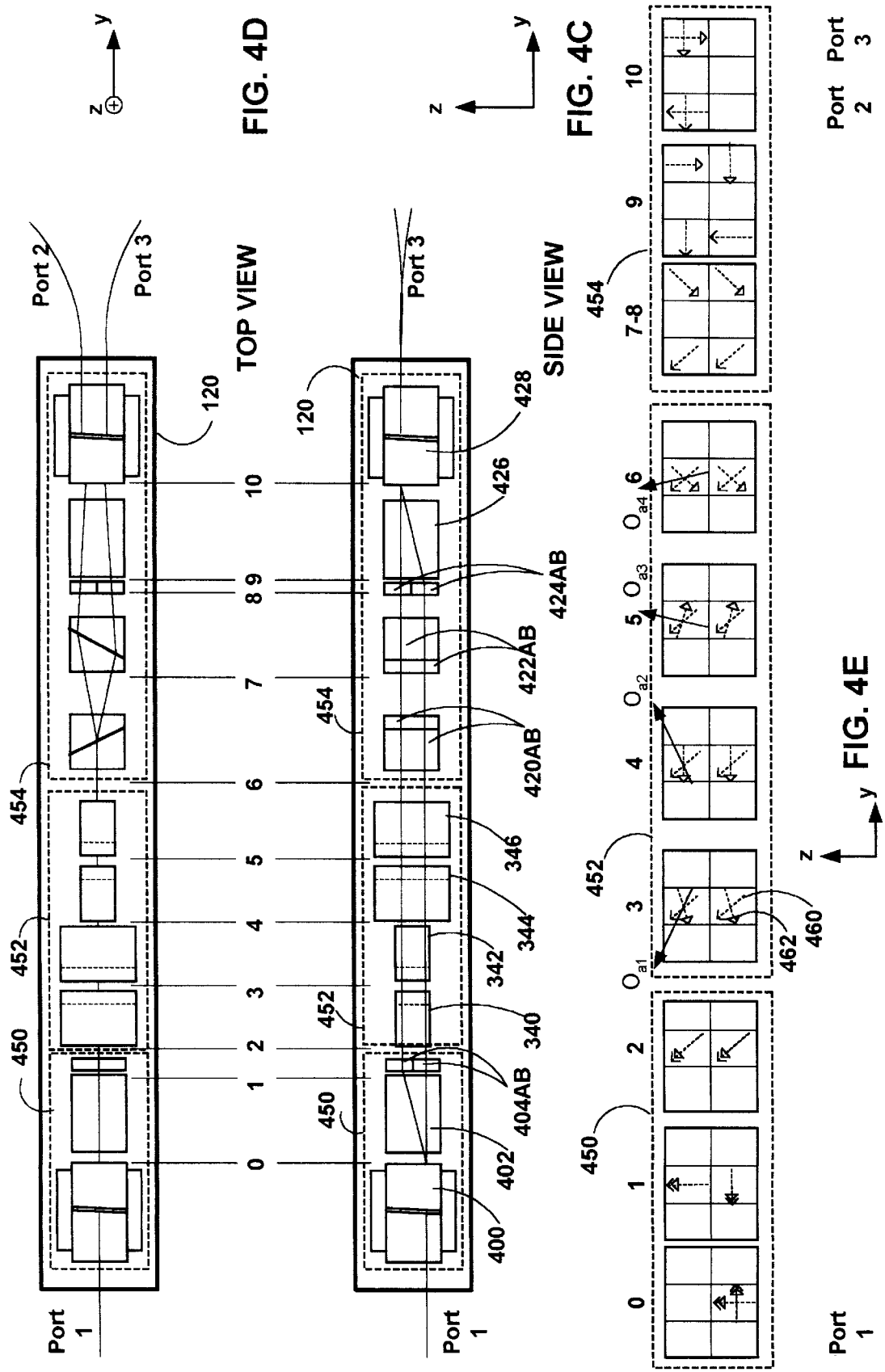

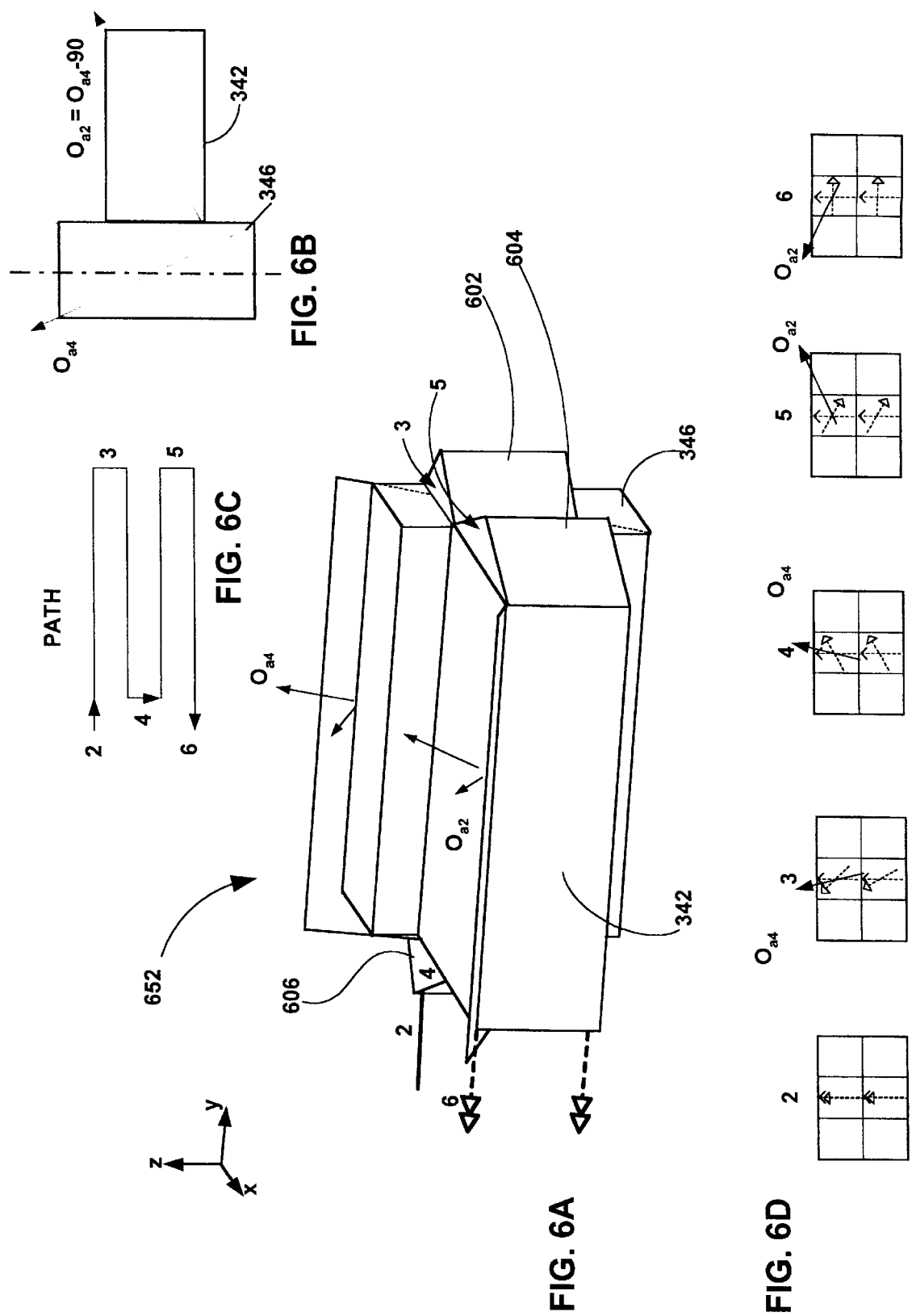

FIG. 6E  TOP VIEW

2 Stage INTERLEAVER

FIG. 7A TOP VIEW

OPTICAL MUX/DEMUX

This application claims benefit of priority under 35 U.S.C. §119(e) of U.S. Provisional Application No. 60/157,265, filed Oct. 1, 1999, entitled "OPTICAL MUX/DEMUX"; U.S. Provisional Application No. 60/166,609, filed Nov. 19, 1999, entitled "OPTICAL MUX/DEMUX DRAWINGS"; U.S. Provisional Application No. 60/168,148, filed Nov. 29, 1999, entitled "OPTICAL MUX/DEMUX FLAT-TOP"; U.S. Provisional Application No. 60/170,452, filed Dec. 13, 1999, entitled "THERMALLY INSENSITIVE POLARIZATION"; and U.S. Provisional Application No. 60/172,741, filed Dec. 20, 1999, entitled "OPTICAL MUX/DEMUX (2)", all of which are hereby incorporated by reference in their entirety.

BACKGROUND OF THE INVENTION

1. Field of Invention

The present invention generally relates to optical fiber communication networks, and more particularly to a splitting system for a multi-channel optical fiber communication network for multiplexing and/or de-multiplexing an optical signal with a plurality of individual channels and various wavelengths.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

The T-1 standards committee ANSI has provided a draft document, "ANSI T1.105-1988", dated Mar. 10, 1988, which sets forth specifications for rate and format of signals which are to be used in optical interfaces. The provided specifications detail the Synchronous Optical Network (SONET) standard. SONET defines a hierarchy of multiplexing levels and standard protocols which allow efficient use of the wide bandwidth of fiber optic cable, while providing a means to merge lower level DS0 and DS1 signals into a common medium. In essence, SONET established a uniform standardization transmission and signaling scheme, which provided a synchronous transmission format that is compatible with all current and anticipated signal hierarchies. Because of the nature of fiber optics, expansion of bandwidth is easily accomplished.

Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions of the light spectrum. Therefore, WDM is the optical equivalent of frequency division multiplexing (FDM). Current implementations of WDM involve as many as 128 semiconductor lasers each lasing at a specific center frequency within the range of 1525–1575 nm. A wavelength division multiplexer (WDM) is usually a passive optical network or device. The WDM can be used to divide wavelengths (or channels) from a multi-channel optical signal or to combine various wavelengths (or channels) on respective optical paths into one multi-channel optical signal on one optical path. Each subscriber datastream is optically modulated onto the output beam of a corresponding semiconductor laser. The modulated information from each of the semiconductor lasers is combined onto a single optic fiber for transmission.

There are three classes of WDM's: coarse, intermediate, and dense. Coarse WDM's are configured for dividing and combining two wavelengths (or channels) that are spaced relatively far apart, e.g., 1310/1550 nanometers. The WDM is used to separate wavelength bands (with 100 nm, i.e., 13 terahertz bandwidth) centered around 1310 nm and 1550 nm. Intermediate WDM's are configured for dividing and combining two or three wavelengths (or channels) that are spaced closer than those of the coarse WDM's, e.g., a 1540/1560 nm WDM used to put to channels approximately 20 nm, i.e. 2.5 terahertz, apart in the 1550 nm wavelength bands. Currently, a third category, dense WDM's (also referred to as DWDM's) are configured for dividing and combining 4, 8, 16, 32, 64, 128 or more wavelengths (or channels) that are very closely spaced. The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz. At this separation, as many as 128 channels may be carried by a single fiber in a bandwidth range within the same capacity of an erbium doped fiber amplifier (EDFA).

Because of the close spacing between the channels in a DWDM, it is desirable to design a DWDM with flat pass bands in order to increase the error tolerance. This is primarily because the center wavelength of a pass band slips with temperature, usually on the order of about 0.011 nm, i.e., 1.4 GigaHertz per degree centigrade. Further, the cascading of the DWDM stages causes the pass bands to become narrower and each DWDM down the chain. Therefore, the larger the pass bands the greater the shift tolerance of the channel.

Further, it is desirable to design a DWDM with low loss to leave more room for loss in other components in network. For example, if losses are reduced, the distance the fiber reaches, i.e. the span, can be longer. As another example, if the power of the transmitting lasers is allowed to be reduced, then inexpensive lasers can be used.

Various devices, such as multi-stage band and comb splitters, have been proposed to fill these new demanding requirements and none are fully satisfactory.

In a multi-stage band splitter, the first stage makes a coarse split of two wavelength ranges, and subsequent stages make finer and finer splits of sub-bands within each of the wavelength ranges. In this scheme, the WDM's of the subsequent stages are largest in quantity and the most expensive to fabricate because they have the smallest channel spacing.

In a multi-stage comb splitter, the first de-multiplexing stage filters out two interlaced periodic sets of relatively narrow band passes and the subsequent stages employ wider band pass periodic filters until the individual channels are de-multiplexed.

In either case, noise and inter-channel interference are limiting factors in the handling of increasingly narrow band pass requirements. Multi-layer thin-film filters can be used to construct optical filters in bulk optics, but they are undesirable because of an increase in the number of layers, precision of manufacture and expense associated with increasingly narrow band pass requirements. Additionally, thin-film optical filters cannot be readily integrated because of difficulties in coupling to and from fibers. Mach-Zehnder interferometers have been widely employed, but they have a sinusoidal response, giving rise to strongly wavelength dependent transmission and a narrow rejection band. Other designs have encountered a variety of practical problems. Accordingly, there is a need for the new type of optical multiplexer/de-multiplexer which can be easily fabricated, with narrower band pass capabilities.

SUMMARY OF THE INVENTION

A method and apparatus for multiplexing/de-multiplexing optical signals is disclosed. The method and apparatus are applicable to a range of optical multiplexing techniques including, but not limited to: wavelength division multiplexing (WDM), dense wavelength division multiplexing (DWDM) and frequency division multiple accessing (FDMA). The disclosed devices do not require active components. The disclosed devices may be implemented with fiber or fiberless optical communications systems including telecommunication systems. The devices may be used on their own or as part of a larger system such as a multi-stage mux/demux, an optical switch or router. The devices exhibit a small form. They may be precisely tuned to a specific wavelength grid.

In an embodiment of the invention, an optical device for operating on optical signals between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The optical device includes a linear polarizer, a plurality of wave plates, and a beam displacer/combiner. The linear polarizer couples to the first port for linearly polarizing optical signals. The plurality of wave plates include a first and a second I/O interface. The plurality of wave plates optically couple at a first I/O interface to the linear polarizer. The plurality of wave plates rotate both odd and even channel components of an optical beam between a linear and an orthogonal relationship depending on the propagation direction. Each of the plurality of wave plates of a selected length and a selected index of refraction and the selected length and the selected index of refraction together determinative of a free spectral range corresponding to a spacing between adjacent gridlines of the selected wavelength grid. Each of the plurality of wave plates is tuned to even symmetry with the selected wavelength grid. The beam displacer/combiner optically couples the second I/O interface of the plurality of wave plates with both the second port and the third port. The beam displacer/combiner displaces and combines orthogonally polarized odd and even channel components of an optical beam depending on propagation direction.

In an alternate embodiment of the invention, a method for splitting/combining odd and even channels of an optical beam between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The method for splitting/combining comprises;

linearly polarizing the optical beam at the first port;
successively retarding the e-ray and o-ray components of a one of the odd channels and the even channels by integer multiples of $2\pi$ and of an other the odd channels and the even channels by odd integer multiples of $\pi$, both at a free spectral range corresponding to the spacing between gridlines of the selected wavelength grid to rotate odd and even channel components of the optical beam between a linear and an orthogonal relationship depending on the propagation direction;
tuning the odd and even channels to even symmetry with the selected wavelength grid; and
displacing and combining orthogonally polarized odd and even channel components of an optical beam depending on a propagation direction.

BRIEF DESCRIPTION OF THE DRAWINGS

These and other features and advantages of the present invention will become more apparent to those skilled in the art from the following detailed description in conjunction with the appended drawings in which:

FIGS. 4CD show top and side elevation views of the periodic optical filter shown in FIGS. 4AB with interfaces to optical ports for multiplexing or de-multiplexing optical signals.

FIG. 4E shows polarization diagrams of light rays at various stages of the mux/demux shown in FIGS. 4CD.

FIG. 6AB are isometric side and end views of a periodic filter which uses an alternate side-by-side embodiment of the 2 crystal stack and folded light path shown in FIG. 5AB.

FIG. 6CD are ray trace and polarization diagrams of light rays at various stages of the periodic filter shown in FIG. 6AB.

FIG. 6E is a top elevation view of the periodic optical filter shown in FIGS. 6AB with interfaces to optical ports for multiplexing or de-multiplexing optical signals.

FIG. 7A is a top plan view of an alternate embodiment of the mux/demux shown in FIG. 6E.

DETAILED DESCRIPTION OF THE EMBODIMENTS

A method and apparatus for multiplexing/de-multiplexing optical signals is disclosed. The method and apparatus are applicable to a range of optical multiplexing techniques including, but not limited to: wavelength division multiplexing (WDM), dense wavelength division multiplexing (DWDM), and frequency division multiple accessing (FDMA). The disclosed devices do not require active components. The disclosed devices may be implemented with fiber or fiberless optical communication systems including telecommunication systems. The devices may be used on their own or as part of a larger system, such as a multi-stage mux/demux, an optical switch, or router. The devices exhibit a small form. They may be precisely tuned to a specific wavelength gRid.

Figure 1:
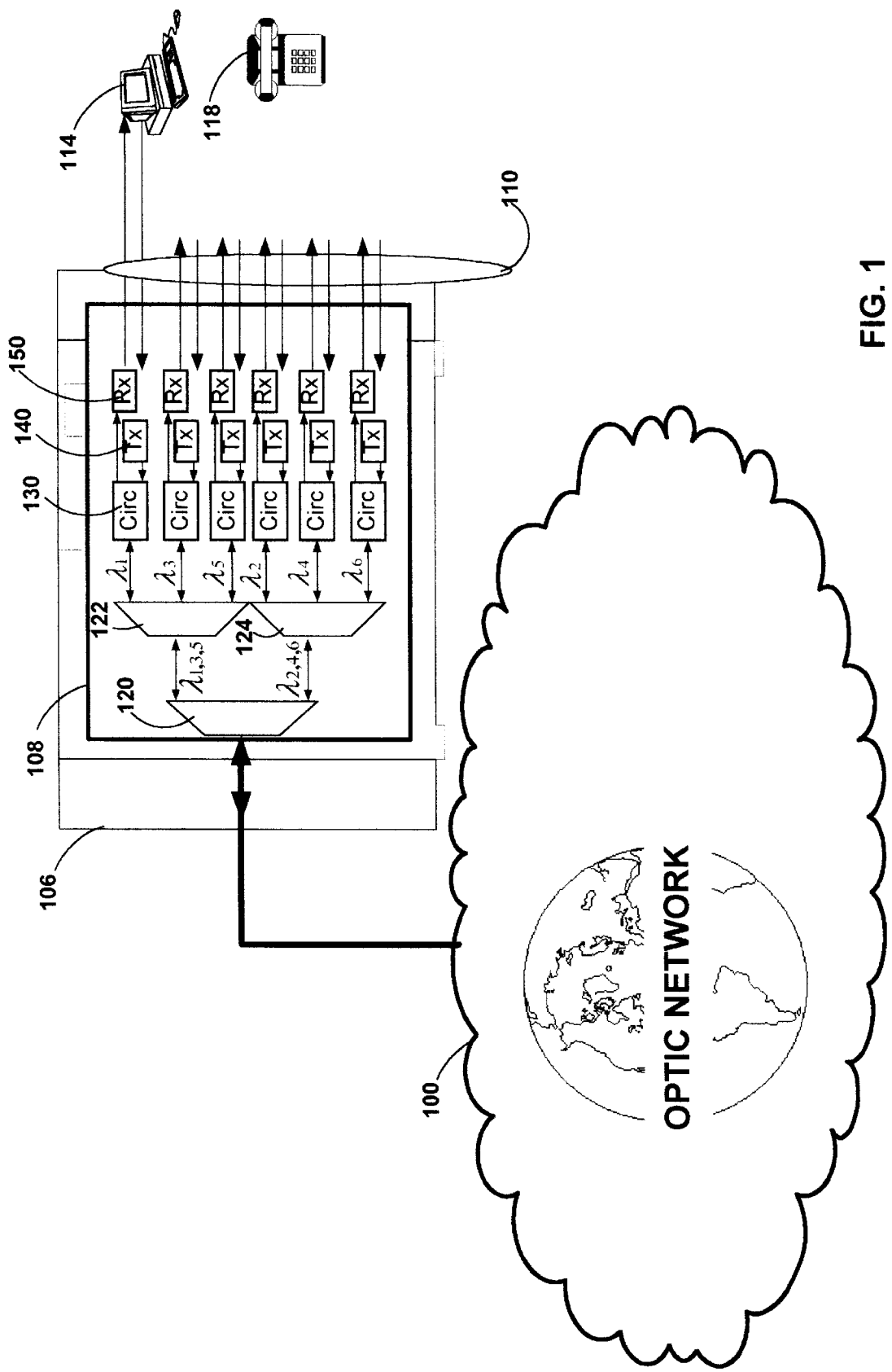
FIG. 1 shows an embodiment of the invention in which an optical network is coupled to a plurality of data and voice subscriber lines by an optical multiplexer/de-multiplexer utilizing periodic optical filters, according to an embodiment of the current invention.

FIG. 1 shows an embodiment of the invention in which an optical network is coupled to a plurality of data and voice subscriber lines by an optical multiplexer/demultiplexer utilizing periodic optical filters, according to an embodiment of the current invention. An optical network 100, a central office or remote terminal 106, a data terminal 114 and voice terminal 118 are shown. Voice/Data communications on the optical network may be implemented in accordance with the Synchronous Optical Network (SONET) or other standard. The modulated data may be carried on a number of channels according to some multiple access protocols, singly or in combination, including, but not limited to: wavelength division multiplexing (WDM), dense wavelength division multiplexing (DWDM), frequency division multiple access (FDMA), etc. Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions of the light spectrum. The precise center frequencies of each channel are specified by standard setting organizations such as the International Telecommunications Union (ITU). These center frequencies are set forth as part of a wavelength grid which defines the center frequencies and spacing between channels.

At each node in the network, e.g., central office or remote terminal 106, optical transceiver mounted on fiber line cards, e.g., card 108 is provided. Each line card includes a multi-stage multiplexer/de-multiplexer 120, 122–124, a circulator bank 130, a transmitter bank 140, and a receiver bank 150. The multiplexer/de-multiplexer is a passive optical device which divides wavelengths (or channels) from a multi-channel optical signal, or combines various wavelengths (or channels) on respective optical paths into one multi-channel optical signal depending on the propagation direction of the light.

In the receive mode, the first stage mux/demux 120 operates as a de-multiplexer, separating the odd from even channels. The odd and even channels are passed to second stage mux/demux 122–124, respectively. The second stage mux/demux may be implemented at a broader bandwidth than is possible with a first stage, since the channels separation has been increased. Each individual channel is then passed on via a corresponding circulator within circulator bank 130 to a corresponding receiver in receiver bank 150. Each receiver includes a narrow band pass photodetector, framer and decoders. Switches (not shown) couple the receiver over the corresponding one of subscriber lines 110 to a voice or data terminal 118, 114, respectively.

In the transmit mode, each line card transmitter bank 140 includes a bank of lasers, e.g., 128 lasers radiating light at one of the selected center frequencies/channels of the telecommunications grid. A framer permits SONET framing, pointer generation and scrambling for transmission of data from the bank of 128 or more lasers and associated drivers, with each laser radiating at a different wavelength/channel within the range of 1525–1575 nm, as specified by the telecommunications grid. Each subscriber datastream is optically modulated onto the output beam of a corresponding semiconductor laser. The modulated information from each of the semiconductor lasers is passed via a corresponding circulator into the second stage multiplexers 122–124, the outputs of which pass to the first stage multiplexer 120 where they are interlaced as odd and even channels onto a single optic fiber for transmission.

The operation of the line card in the embodiment shown is duplex, meaning that bi-directional communications are possible. Thus, the same device operates as a multiplexer and de-multiplexer.

The optical mux/demux may be implemented as part of a larger telecommunications system such as an optical switch or router, without departing from the scope of the claimed invention. In a router embodiment one or more optical switches would be sandwiched between the opposing mux/demux.

FIGS. 2A–F are signal diagrams showing the passive signal processing accomplished by the periodic optical filters of the current invention.

Figure 2A:
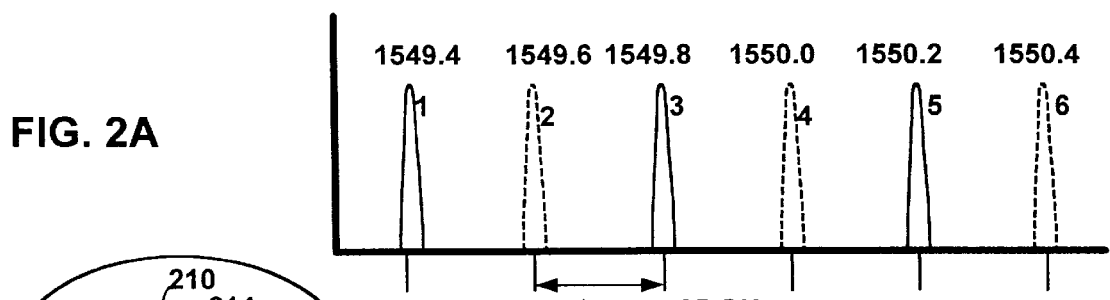
FIGS. 2A–F are signal diagrams showing the passive signal processing accomplished by the periodic optical filters of the current invention.

FIG. 2A is a graph of amplitude vs. frequency showing the envelope associated with six narrowly spaced, i.e., 25 GHz or 0.2 nm WDM channels. The odd channels 1, 3 and 5 are shown in solid line. The even channels 2, 4 and 6 are shown in dashed line. Superimposed over each channel is the center wavelength in nanometers.

Figure 2B:
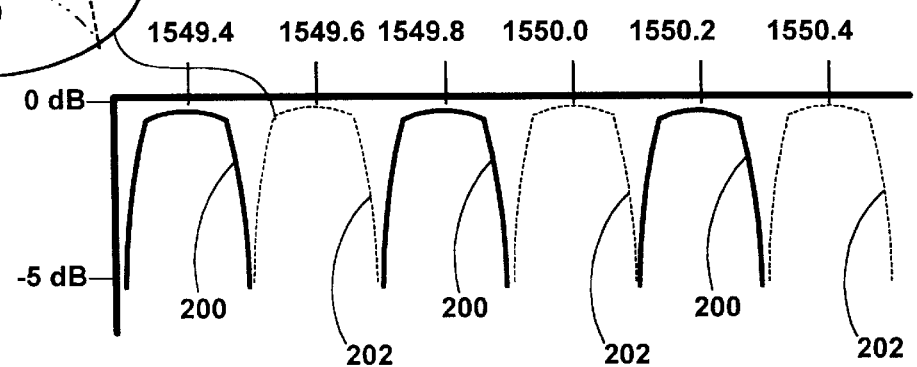

FIG. 2B is a graph of periodic filter response, in terms of transmission, in decibels vs. frequency. An odd set 200 and an even set 202 of periodic filter transmission characteristics are shown in solid and dashed line, respectively. The optical elements from which these characteristics may be attained are shown in the following figures and accompanying text. The transmission of the filters is periodic with pass bands with a periodicity substantially similar to that of the odd or even channels shown in FIG. 2A, i.e., 50 GHz. In enlarged view, the peak transmission characteristics of the filters are shown. A representative even pass band peak is shown with a flat top 210 with distinct edges 212–214 superimposed over a sinusoidal transmission curve. A filter transmission with periodic flat tops is preferred because each channel is subject to shifting around the center frequency and a flat top avoids attenuation of a channel subject to such shifting. Shifting may be caused by any one of a number of factors including temperature, inter-channel interference and polarization mode dispersion.

Figure 2C:
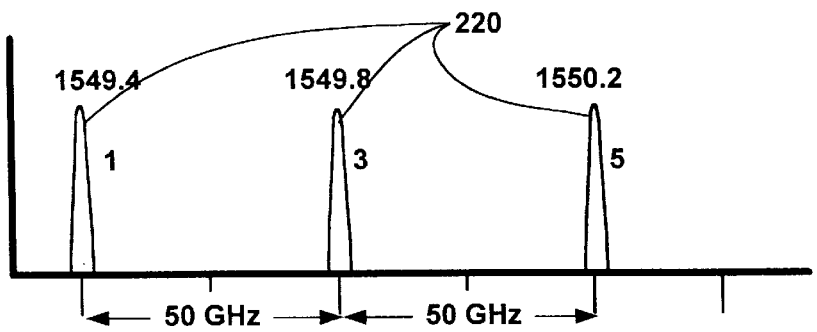
Figure 2D:
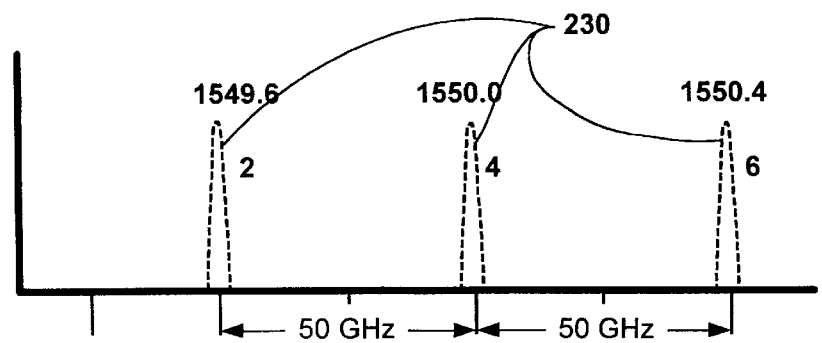

FIGS. 2CD are graphs which show signal profiles after filtration by the periodic filters of the current invention. The original odd and even channel sets shown in FIG. 2A are separated into odd channels 220 (See FIG. 2C) and even channels 230 (See FIG. 2D). In a multi-stage demux this process of periodic filtration can be applied to subsequent stages until individual channels are obtained. Alternately, de-multiplexing can be achieved by other forms of filtration in subsequent stages since the channel spacing has been doubled from 25 to greater than 50 Ghz.

Figure 2E:
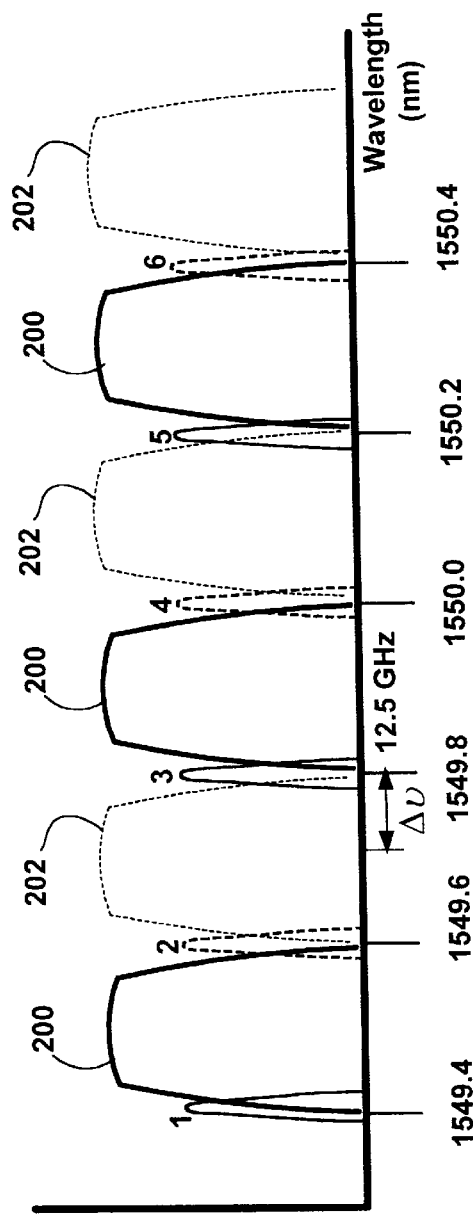
Figure 2F:
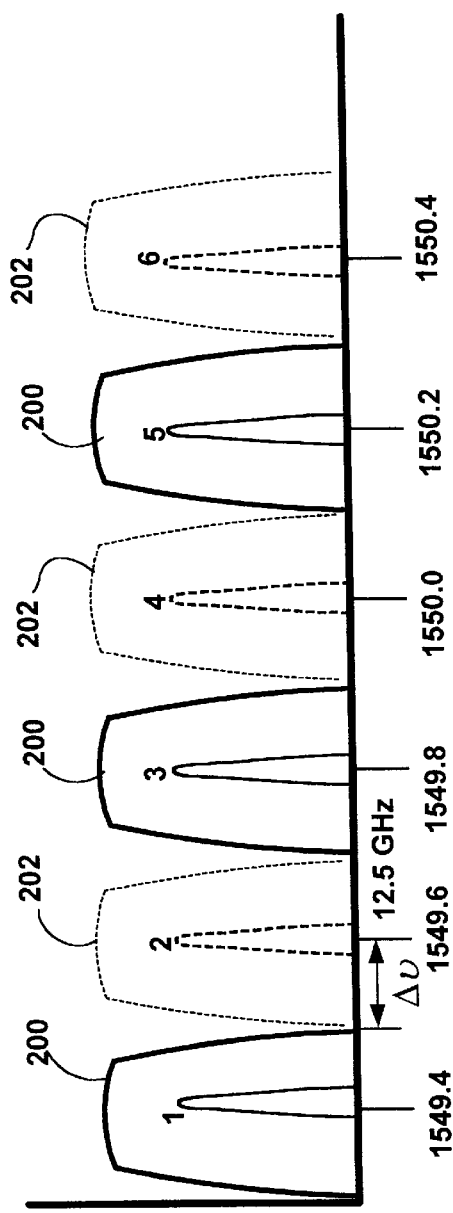
Figure 3E:
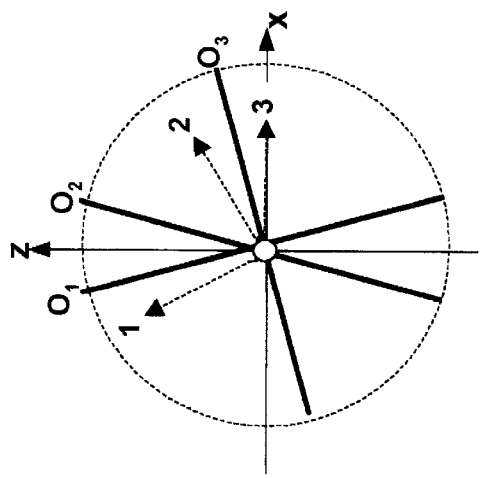
FIGS. 3A, C, E, G, I and K are graphs showing the optical axes and polarization vectors associated with periodic optical filters fabricated from 1, 2, 3, 4, 5 and 6 birefringent crystal stacks, respectively.
FIGS. 3B, D, F, H, J and L are isometric side views of periodic optical filters with 1, 2, 3, 4, 5 and 6 birefringent crystal stacks, respectively.
FIG. 3M is an enlarged side elevation view of the 4 crystal stack shown in FIG. 3H, showing the tuning of each crystal's center frequency to a telecommunications grid such as is shown in FIGS. 2E–F.
Figure 3F:
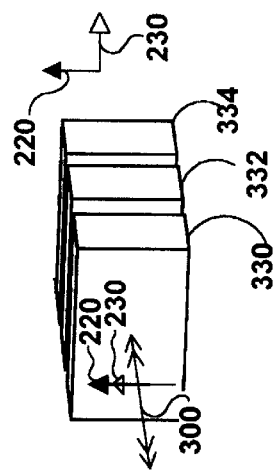
Figure 3F:
Figure 3C:
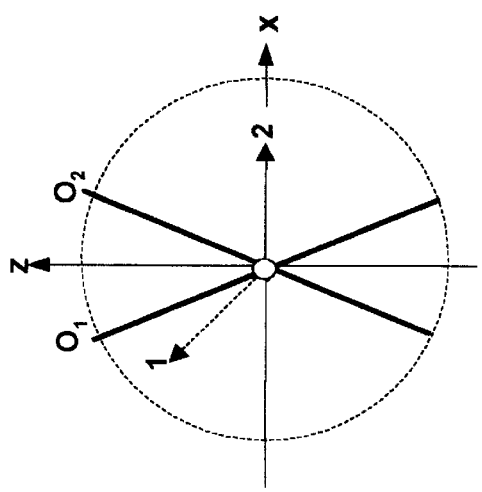
Figure 3D:
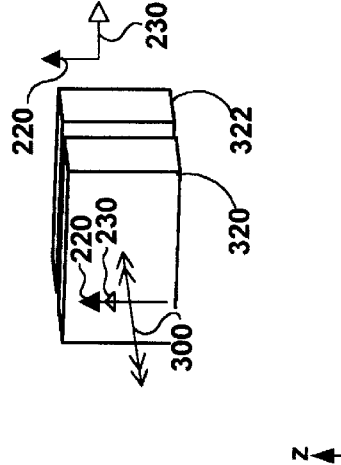
Figure 3A:
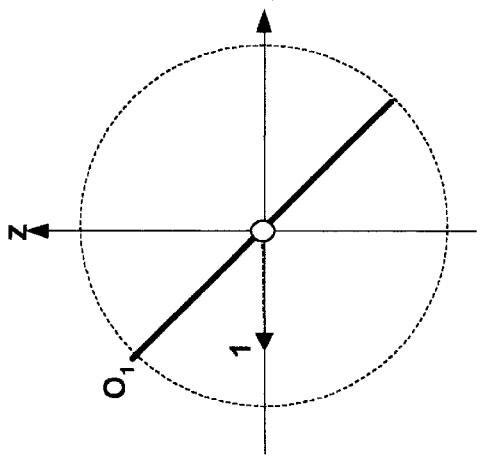
Figure 3B:
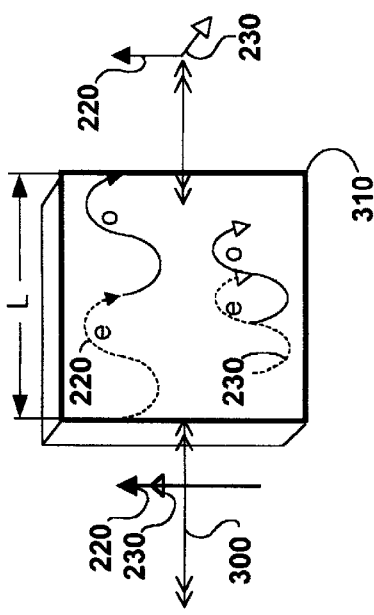
Figure 3G:
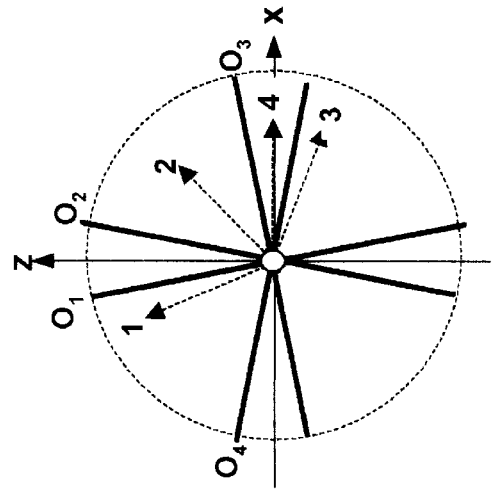
Figure 3H:
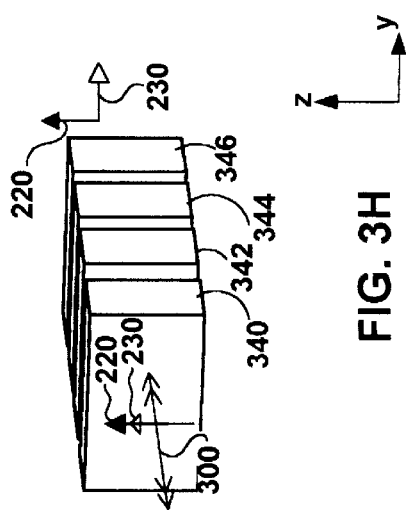
Figure 3I:
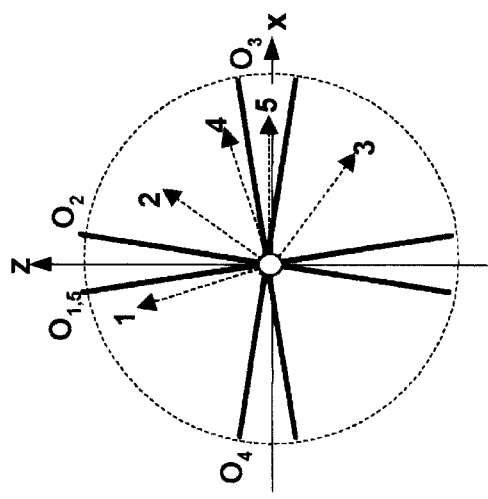
Figure 3J:
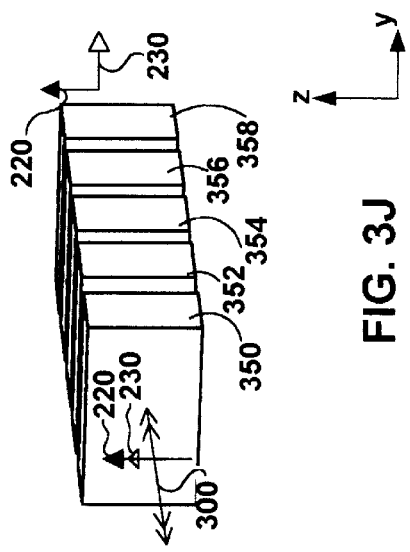
Figure 3K:
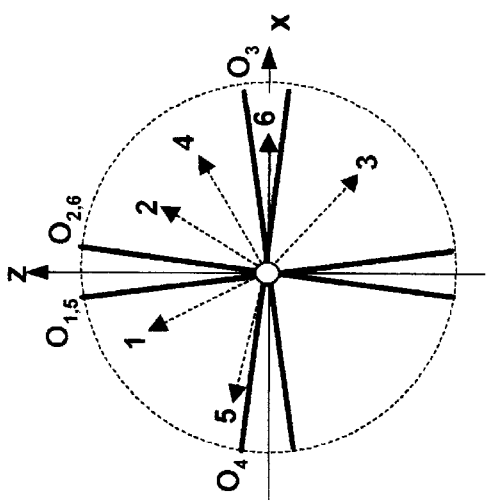
Figure 3L:
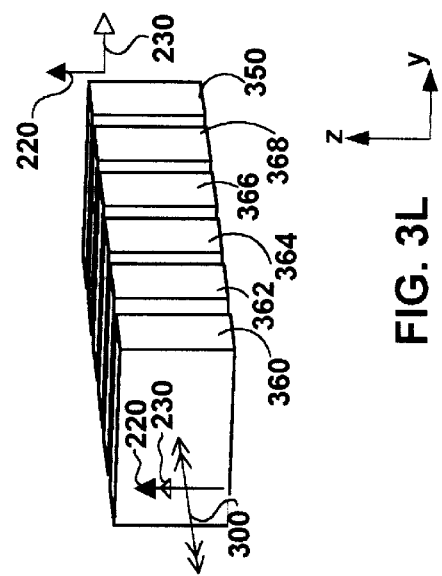
Figure 3M:
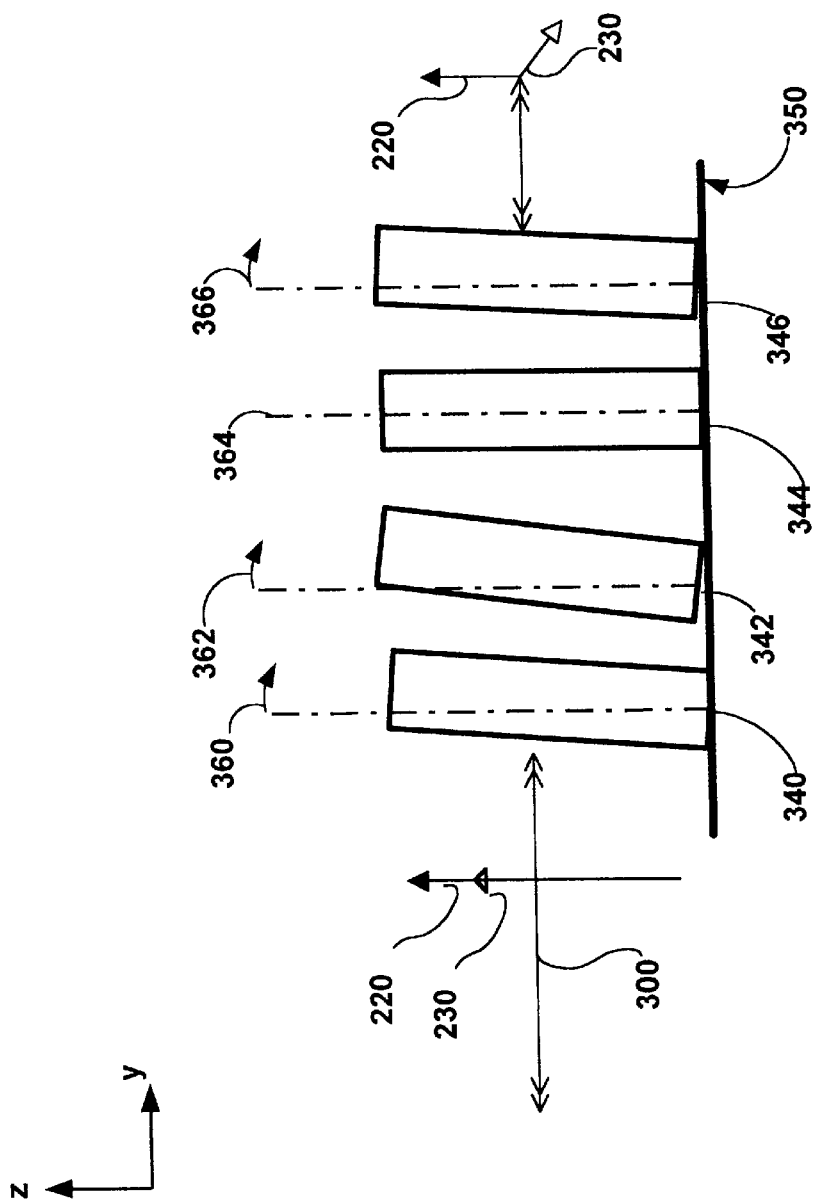

In addition to providing periodic flat top filtration, the periodic filters of the current invention are also easily tuned, as will be shown in FIG. 3M. An un-tuned and tuned periodic filter response is shown in FIGS. 2EF, respectively. Both figures show both odd and even channels superimposed on periodic filter transmission characteristics. In FIG. 2E, the periodic filter is 180 degrees out of alignment with the telecommunications grid. In this instance, the filters uniformly block all channels. FIG. 2F shows the phase relationship between the periodic filter transmission and the channels shifted, as required, so that each channel, odd/even, is centered under a pass band peak.

Waveplates

The periodic filters of the current invention may be fabricated from wave plates. When the optic axis of a birefringent crystal is arranged to be substantially parallel with the entrance/exit surfaces of a light beam, the crystal operates as a retarder or wave plate. Light passing through the crystal is separated into ordinary and extraordinary rays, each of which experiences a different index of refraction, $n_o$ and $n_e$, respectively. Since the index of refraction of a material identifies the ratio of the speed of light in a vacuum to that of light in a vacuum, the e- and o-rays are said to travel along fast/slow paths. The relative optical path length difference between the e-wave and the o-wave is expressed in the following Equation 1 as a product of the length L of the crystal and the difference between the indices of refraction for the e- and o-rays.

$$\Lambda = L(|n_o - n_e|) \qquad \text{Equation 1}$$

The difference in optical path length results in an absolute phase shift between the e-wave and o-wave components of an incident light beam which increases across the length of the crystal. The longer the wavelength of light entering the crystal, the greater the thickness of the crystal required to achieve the same overall phase shift.

Half

Where the relative optical path length difference corresponds to half that of the incident wavelength or odd integer multiples thereof, the retarder is classified as a half wave plate, as expressed in the following Equation II:

$$L(|n_o - n_e|) = \frac{(2m+1)\lambda_o}{2} \qquad \text{Equation II}$$

where m is an integer corresponding to the order of the wavelength $\lambda_0$. Where such a relationship exists, linearly polarized light which enters the plate emerges from the plate with a relative phase shift of ½π and a shift in the direction of the polarization vector, as shown in the following diagram.

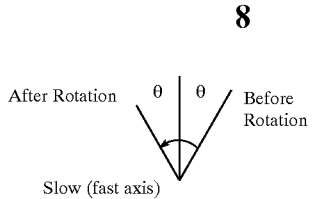

Full

Where the optical path length corresponds to that of the incident wavelength or integer multiples thereof, the retarder is classified as a fall wave plate, as expressed in the following Equation III.

$$L(|n_o - n_e|) = m\lambda_o \qquad \text{Equation III}$$

No rotation of the polarization vector occurs for wavelengths of light at which the plate operates as a full wave plate.

Now a wave plate has a free spectral range (FSR). The free spectral range correlates with the minimum resolvable bandwidth of the wave plate. FSR is defined in the following Equation IV.

$$FSR_v = \frac{1}{2} \times \frac{c}{L(|n_o - n_e|)} \qquad \text{Equation IV}$$

where c is the speed of light in a vacuum. As either the length or the difference in the indices of refraction of the e- and o-rays for a crystal increases, its FSR decreases. If the FSR of the one or more wave plates are set equal to the channel separation between adjacent channels, then odd and even channels can be separated by passing them through such a wave plate or set of wave plates. Each wave plate in the stack will operate as a full wave plate to one of the odd or even channels, and a half wave plate to the other. That set of channels for which the wave plates are half wave plates will exhibit a shift in polarization vector during passage through the wave plate stack. When that shift in polarization vectors of odd and even channels approaches 90 degrees, the separation will be at a maximum.

Where the crystal is Ytrium Vandanate YVO4; $n_o$=1.9447 and $n_e$=2.1486. Assuming a channel spacing, such as that shown in FIG. 2A of 25 GigaHertz or 0.2 nm, the required length of the crystal would be 28.6 mm. The following table shows the indices of refraction for a range of birefringent materials.

TABLE I

| 1550 nm | YVO$_4$ | LiNbO$_3$ | KTP | a-BBO | Calcite | Crystal Quartz | Rutile |
|---|---|---|---|---|---|---|---|
| no | 1.9447 | 2.21283 | Nx, 1.72949 Ny, 1.73698 | 1064 nm 1.65790 | 1.63361 | 1.52781 | 2.45318 |
| ne | 2.1486 | 2.1374 | Nz, 1.81584 | 1.58462 | | 1.47722 1.53630 | 2.7093 |

FIGS. 3A, C, E, G, I and K are graphs showing the optical axes and polarization vectors associated with periodic optical filters fabricated from 1, 2, 3, 4, 5 and 6 birefringent crystal stacks shown in isometric views in FIGS. 3B, D, F, H, J and L, respectively. The following Table II shows for each stack the optical axis Oa of each crystal in relation to the initial polarization vector IPv of the odd and even channels 220–230 which are multiplexed on the linearly polarized optical beam 300 which strikes the first crystal 340 of the stack. Additionally, the polarization vector Pv is shown in any successive crystals in the stack is shown. A single crystal 310 is shown in FIG. 3B. Two crystals 320–322 are shown in FIG. 3D. Three crystals 330–334 are shown in FIG. 3F. Four crystals 340–346 are shown in FIG. 3H. Five crystals 350–358 are shown in FIG. 3J. Six crystals 360–368 are shown in FIG. 3L. The vector Pv is for whichever of the odd or even channel sets experiences each crystal in the stack as a half wave plate is shown. The polarization vector for the other of the channel sets which experiences the stack as a series of full wave plates is not shown, since for that channel set, the initial polarization vector is not rotated as it passes through the stack. Each polarization vector and optical axis is labeled with a subscript indicating the crystal with which it is associated. Note that even where the number of crystals in the stack exceeds four, e.g. FIGS. 3I–L only four optical axis are required to orthogonalize the odd and even channels.

requires fewer terms to generate than the latter and thus fewer crystals. This is advantageous since it reduces the complexity, cost, and form factor of the resultant multiplexer. See S. E. Harris et al., *Optical Network Synthesis Using Birefringent Crystals*, JOURNAL OF THE OPTICAL SOCIETY OF AMERICA, VOLUME 54, Number 10, October 1964 for a general discussion of transfer functions related to birefringent crystals, which is hereby incorporated by reference as if fully set forth herein.

FIG. 3M is an enlarged side elevation view of a periodic filter fabricated from four crystals 340–350 as shown in FIG. 3H. Filters with the required periodicity may not also exhibit the proper phase relationship between the center of their pass bands and the gridlines of the telecommunications or other grid on which individual channels are centered. Therefore, it may be necessary to tune each individual

TABLE II

| In/Out | 1 | | 2 | | 3 | | 4 | | 5 | | 6 | |
|---|---|---|---|---|---|---|---|---|---|---|---|---|
| | IPv | Oa | Pv | Oa | Pv | Oa | Pv | Oa | Pv | Oa | Pv | Oa | Pv |
| FIG. 3AB | 0 | 45 | 90 | | | | | | | | | | |
| FIG. 3CD | | 22.5 | 45 | −22.5 | −90 | | | | | | | | |
| FIG. 3EF | 0 | 15 | 30 | −15 | −60 | −75 | −90 | | | | | | |
| FIG. 3GH | | 11.25 | 22.5 | −11.25 | −45 | −78.75 | −112.5 | 78.75 | −90 | | | | |
| FIG. 3IJ | 0 | 9 | 18 | −9 | −36 | −81 | −126 | 81 | −72 | −9 | −90 | | |
| FIG. 3KL | | 7.5 | 15 | −7.5 | −30 | −82.5 | 45 | 82.5 | −60 | 7.5 | 75 | −7.5 | −90 |

The equation for the angle of optical axis of each crystal of a stack of N crystals with FSR substantially equal to the grid or channel spacing is set forth in the following Equation 5.

$$\Phi_n = (-1)^n \left[ \frac{\pi}{4} \times \left\{ \left( n + \frac{1 + 3 \times ((-1)^n)}{2} \right) - \frac{2i+1}{N} \right\} \right] \quad \text{Equation V}$$

Where $\Phi_1$ is the angular orientation of the optical axis of the first crystal in the stack with respect to the vertical, "Z" axis. Where N is the total number of crystals in the stack. Where i is an integer including zero. Where n is the crystal number in the stack with n=1 corresponding to the first crystal in the stack and n=N corresponding to the last crystal in the stack.

The output polarization angle $\theta n$ of the channel(s) for which the crystal acts as a half wave plate may be expressed as a function of the optical axis of the $n_{th}$ crystal $\Phi n$ and the output polarization angle of the prior crystal $\theta(n-1)$ as expressed in the following Equation 6.

$$\theta_n = \Phi n + (\Phi n - \theta_{(n-1)}) = 2\Phi_n - \theta_{(n-1)} \quad \text{Equation VI}$$

Where the stack is composed of an even number of crystals, the incident polarization angle of the incoming light beam on the first crystal of the stack may be arbitrarily chosen, although 0° is preferred. Where the stack is composed of an odd number of crystals, the incident polarization angle should be 0°, 90°, 180°, or 270°, with respect to the vertical. As the crystal number increases, the flat top transmission characteristic of the stack becomes more pronounced. For N=1, the response is sinusoidal.

Relatively few crystals are required in the stack to achieve a flat top transmission characteristic. This results from the fact that the transfer function from which these geometric relationships were derived combines a triangle wave and a flat top, as opposed to a rectangular wave. The former crystal so that its pass bands are aligned with the ITU or other grid, as shown in FIGS. 2E–F. This may be achieved by tilting each crystal on either the fast or slow axis by an amount necessary to produce the required phase shift. Thus, crystal 340 is tilted by an angle 360, crystal 342 is tilted by an angle 362, crystal 364 requires no tilting, and crystal 346 is tilted by an angle 366.

Figures 4A, 4B:
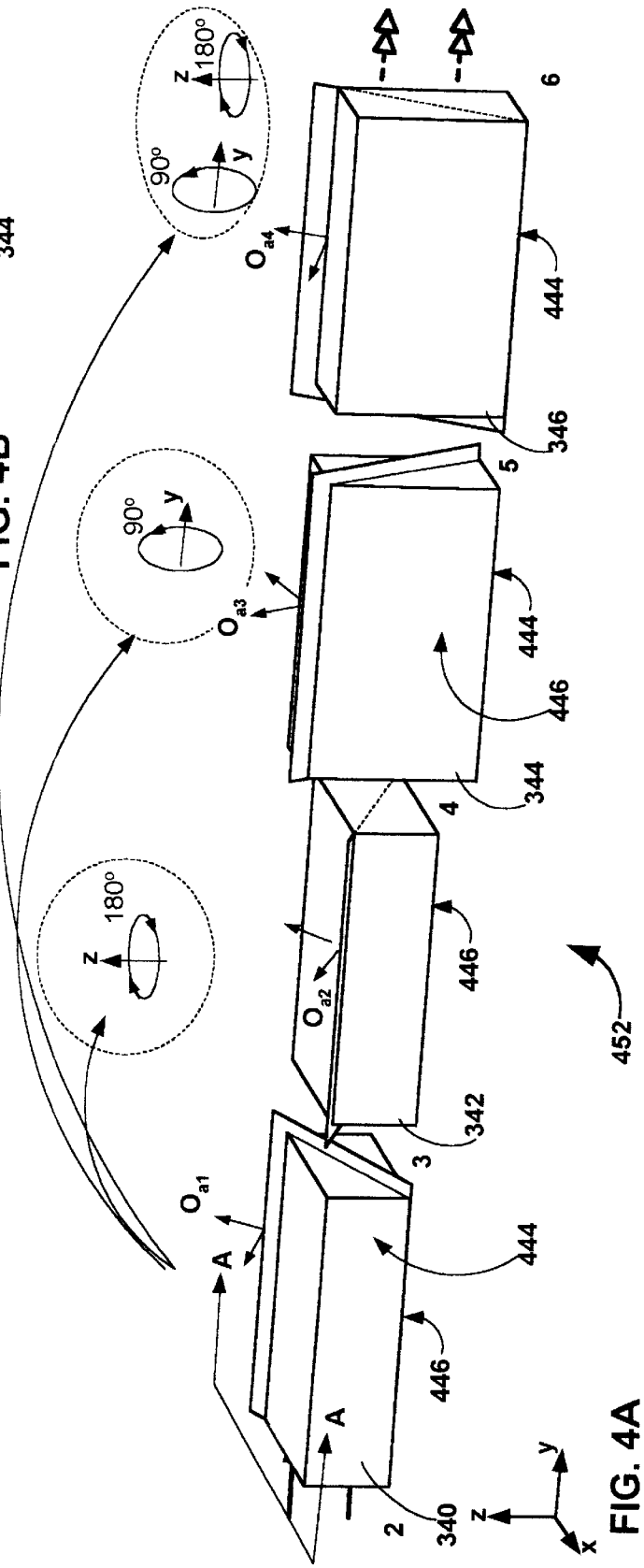
FIGS. 4AB show an isometric side view and an end view of a periodic optical filter fabricated from a single crystal in four discrete orthogonal orientations.

FIGS. 4AB show an isometric side view and an end view of a periodic optical filter stack 452 fabricated from four discrete orthogonal orientations of a crystal with a fixed geometric relationship between its optic axis and each of its sides. Specifically, the optic axis is aligned at an angle of +/−11.25 degrees with respect to an internal normal to side 444, depending on which end the light beam is entering. Since the adjacent side 446 is orthogonal to side 444, the optic axis is aligned at +/−78.75 with respect to the internal normal to this side. These are precisely the angles called for in Equation 5 and shown in Table II. Thus, a stack of wave plates can be constructed from a single crystal mounted to a frame on either of two sides. In the example shown, crystal 340 may be mounted on side 446. Crystal 342 may be mounted on that same side, i.e., side 446, provided the crystal is rotated end-to-end 180 degrees around the z-axis to flip the angle of the optic axis with respect to the z-axis. The crystal 344 may be rotated 90 degrees around the y-axis and mounted on side 444. Crystal 346 may be mounted on that same side, i.e., side 444, provided the crystal is rotated end-to-end 180 degrees around the z-axis to flip the angle of the optic axis with respect to the z-axis. These relationships are shown in FIG. 4A.

As is evident from Equation 5 and Table II, as the number of crystals in the stack increases, the geometric orientations of the optic axis do not exceed four and those four may be obtained by the simple geometry set forth above. This allows all crystals to be side mounted on only one of two sides. Where $\Phi_1$ is the angular orientation of the optical axis of the first crystal in the stack with respect to the z-axis; the optic axis of the second crystal will be at an angle $-\Phi_1$ with respect to the z-axis; the third crystal at $\Phi_1$ with respect to the x-axis; and the fourth at $-\Phi_1$ with respect to the x axis. For the fifth crystal and higher the relationship repeats itself. This relationship may alternately be expressed as follows where again $\Phi_1$ is the angular orientation of the optical axis of the first crystal in the stack with respect to the z-axis.

Crystal #1 $\Phi_1$
Crystal #2 $\Phi_2 = -\Phi_1$
Crystal #3 $\Phi_3 = -(90° - \Phi_1)$
Crystal #4 $\Phi_4 = (90° - \Phi_1)$
Crystal #5 $\Phi_1$ ... and so forth.

This relationship is shown in FIG. 4B.

FIGS. 4CD show top and side elevation views of the periodic optical filter shown in FIGS. 4AB with a linear polarizer interface 450 to port 1, a periodic optical filter stack 452, and a beam displacer/combiner interface 454 to optical ports 2–3. The linear polarizer couples to the first port to linearly polarize arbitrarily polarized incoming light. The beam displacer/combiner interface displaces and combines orthogonally polarized odd and even channel components of an optical beam depending on the propagation direction of the light beam. The linear polarizer includes, in this embodiment of the invention, a lens 400, a polarization beam splitter/combiner 402 and polarization rotators 404AB. The lens focuses or collimates light depending on propagation direction of light. The polarization beam splitter combiner splits an arbitrarily polarized optical beam into component beams with orthogonal polarization vectors and combines two component beams with orthogonal polarization vectors into the optical beam depending on the propagation direction. The polarization rotators rotate component beams with orthogonal polarization vectors into linear alignment and rotate linearly aligned polarization vectors into orthogonal polarization vectors depending on the propagation direction. The periodic optical filter stack 452 includes birefringent crystals 340–346. The beam displacer/combiner interface includes a first beam angle turner 420AB, a second beam angle turner 422AB, a polarization rotator 424AB, a polarization beam splitter/combiner 426, and a lens 428. The beam angle turners turn the odd and even channel components of an optical beam through an angle such that the path of the odd and even channel components converge or diverge, depending upon the polarization direction of the odd and even channel components and the propagation direction. The polarization rotator rotates linearly aligned polarization vectors of the odd and even channel components into orthogonal polarization vectors and rotates odd and even channel components with orthogonal polarization vectors into linear alignment depending on the propagation direction. The polarization beam splitter/combiner combines separate odd and even channel components with orthogonal polarization vectors into the optical beam and splits an arbitrarily polarized optical beam into component beams with orthogonal polarization vectors depending on the propagation direction.

FIG. 4E shows polarization diagrams of light rays at various stages of the mux/demux shown in FIGS. 4CD. One of the odd/even channel components is shown with an open arrowhead while the other is shown with a closed arrowhead. The stages are numbered from 0–10 and correlate with sequential locations shown in FIGS. 4CD. In the following discussion, the operation of the mux/demux in the de-multiplexer mode is discussed. In this mode, light with component odd and even channels enters from port 1 and exits via ports 2 and 3 as separate component beams, one with substantially odd channels and the other with substantially even channels. The device may also perform as a multiplexer by simply reversing the direction of propagation of light. Thus, odd channels on one of ports 2–3 and even channels on the other of the ports 2–3 may be introduced to the device, whereupon interlaced odd and even channels will exit the device and enter port 1.

Polarization diagram "0" shows an arbitrarily polarized beam from port 1 which has been collimated by lens 400. Lens 400 serves to collimate the incoming light containing all channels, odd and even. In an embodiment of the invention a Gradient Index of Refraction Lens (GRIN) lens may be utilized. Next, light is passed through the polarization beam splitter/combiner 402. This element splits the arbitrarily polarized optical beam into component beams with orthogonal polarization vectors, as shown in polarization diagram "1". In an embodiment of the invention a birefringent crystal may be utilized. Subsequently, the two orthogonal polarization vectors are rotated into alignment by polarization rotator(s) 404AB, as shown in polarization diagram "2". In an embodiment of the invention a relatively thin, i.e., broadband, half wave plate which rotates both odd and even channels may be utilized. The two rays which form the output of the linear polarizer 450 contain both the odd and even channel components. Additionally, since they are derived from mutually orthogonal polarization vectors of the incoming light from port one, they collectively contain substantially all the power present in the original beam.

These discrete rays are passed to one end of the periodic filter stack 452. That end shall be identified as first I/O interface of the periodic filter stack. As shown in polarization diagrams 3–6, each successive crystal in the stack serves as a half plate to one of the odd and even channels in each of the two rays and as a whole wave plate to the other. The geometry of the optical axis of each crystal is such that the rays exit the opposite end of the stack, the second I/O interface, with orthogonally polarized odd and even channel components for each ray. This state is shown in polarization diagram "6".

Next, both rays are directed into the beam displacer/combiner and specifically to a pair of beam angle turners 420AB, 422AB. These elements turn the odd and even channel components through an angle thereby diverging/separating the odd and even components of each ray, as is shown in polarization diagram 7–8. In an embodiment of the invention these elements include birefrigent prism pairs (modified Woltson prisms). Then the components of each ray are passed through the polarization rotator(s) 422AB which orthogonalize the odd and even channel components of each ray. This state is shown in polarization diagram "9". Suitable elements for this function include the broadband half wave plate(s) discussed above. Then the rays and components are passed through the polarization beam splitter/combiner where the orthogonally polarized odd and even channel components are combined with their counterparts to form component beams entering ports 2–3 via GRIN lens 428.

The operation of the device may be reversed to perform as a multiplexer. Thus, mux/demux may perform as a multiplexer, as a de-multiplexer, or as a combined multiplexer/de-multiplexer.

Figures 5A, 5B, 5C, 5D:
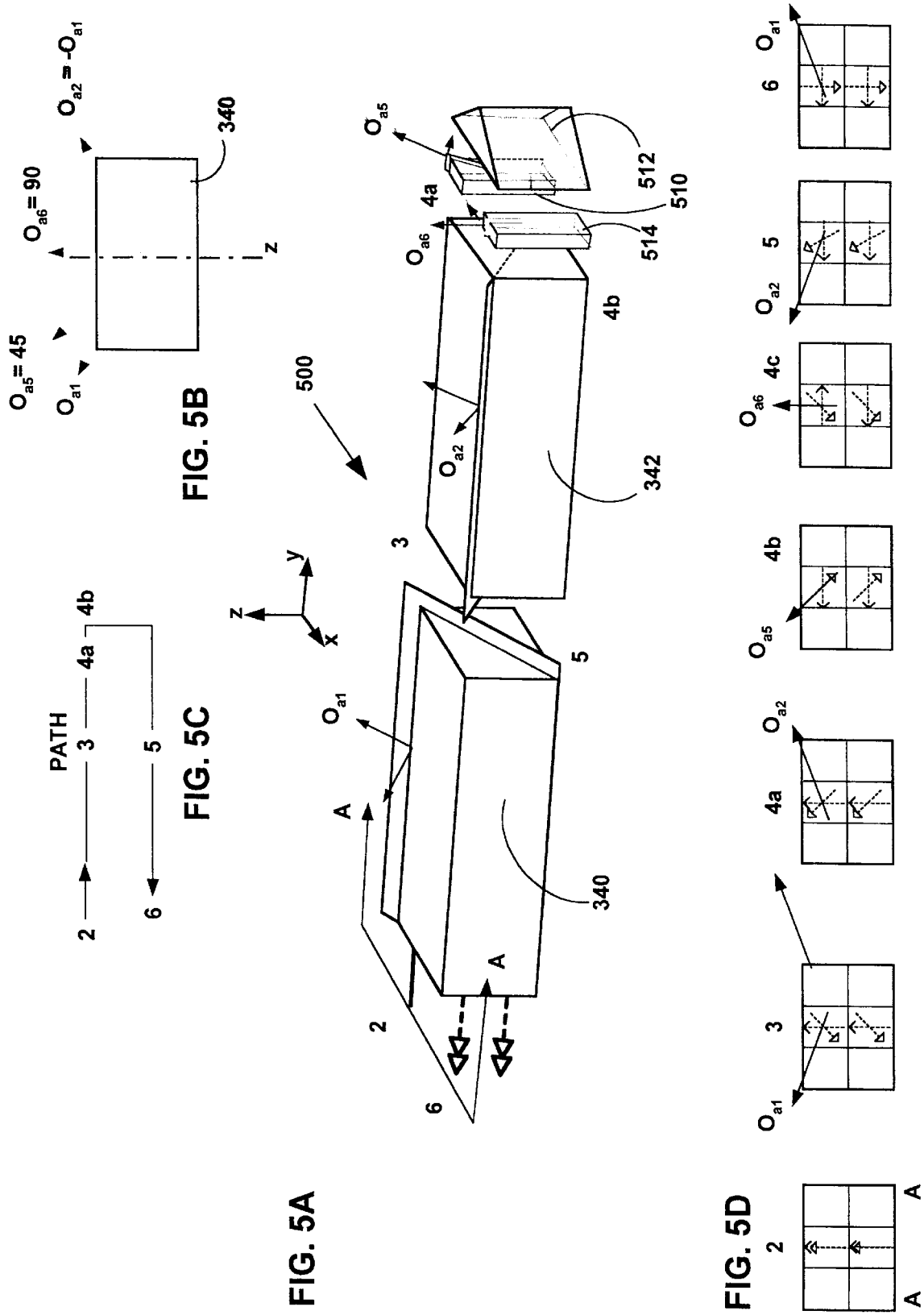
FIG. 5AB are isometric side and end views of a periodic filter which uses a 2 crystal stack and a folded light path to achieve optical filtration equivalent to that associated with a 4 crystal stack.
FIG. 5CD are ray trace and polarization diagrams of light rays at various stages of the periodic filter shown in FIG. 5AB.

FIG. 5AB are isometric side and end views of a periodic filter set 500 which uses a folded propagation path through a 2 wave plate stack to achieve optical filtration equivalent to that associated with a 4 wave plate stack 452 (see FIG. 4AE), and with a reduced form factor. The odd and even periodic filter bandpasses have flat tops substantially as pronounced as may be achieved with 4 discrete crystals.

Crystals 340 and 342 are shown. A retroreflector 512 is optically coupled to the end of crystal 342 to create a return path through the stack shown in FIG. 5C. Two broadband half wave plates 510,514 are sandwiched between the retroreflector and the wave plate 342 to rotate the odd and even components by an appropriate amount so as to align them properly with the optical axis of wave plate 342 for the return path through that wave plate. The optical axis of wave plate 510 is aligned at 45 degrees to the vertical "z" axis in the z-y plane. The optical axis of wave plate 514 is aligned with the vertical "z" axis in the z-y plane.

FIG. 5D is a set of polarization diagrams of light rays at various stages of the periodic filter shown in FIG. 5AB. Light enters the stack with two rays, each of which has odd and even components as shown in polarization diagram "2". Those rays enter at the first I/O interface on one end of wave plate 340. On the same end of the wave plate, a second I/O interface is formed where the component beams with orthogonal odd and even polarization vectors exit the stack.

The embodiment shown in FIG. 5AD may be combined with the linear polarizer 450 and the polarization beam displacer/combiner 454 (See FIGS. 4CE).

FIG. 6AB are isometric side and end views of a periodic filter set 652 with an alternate side-by-side embodiment to the 2 wave plate stack with folded beam path shown in FIG. 5AB. Optical filtration equivalent to that associated with a 4 wave plate stack 452 (see FIG. 4AE) is achieved and with a reduced form factor. Wave plates 342 and 346 are shown. Three retroreflectors 602–606 bend light rays on the path shown in FIG. 6C, with the light passing twice through each wave plate. Retroreflector 602 bends the rays back through wave plate 346. Retroreflector 606 bends the rays from wave plate 346 onto a return path through wave plate 342. Retroreflector 604 bends the rays back through wave plate 342.

FIG. 6D is a polarization diagram set 2–6 of light rays at various stages of the periodic filter shown in FIG. 6AB. Light which enters with both components, odd and even, linearly polarized, exits with two component beams one with the odd channels and the other with the even.

FIG. 6E is a top elevation view of the periodic optical filter stack 652 with a folded propagation path shown in FIG. 6AB with interfaces to optical ports for multiplexing or de-multiplexing optical signals. The linear polarization interface 450 is shown coupled to the first I/O interface of the stack 652, while the beam displacer/combiner 454 is coupled to the second I/O interface of the stack 652 via a retroreflector 614.

Figure 6F:
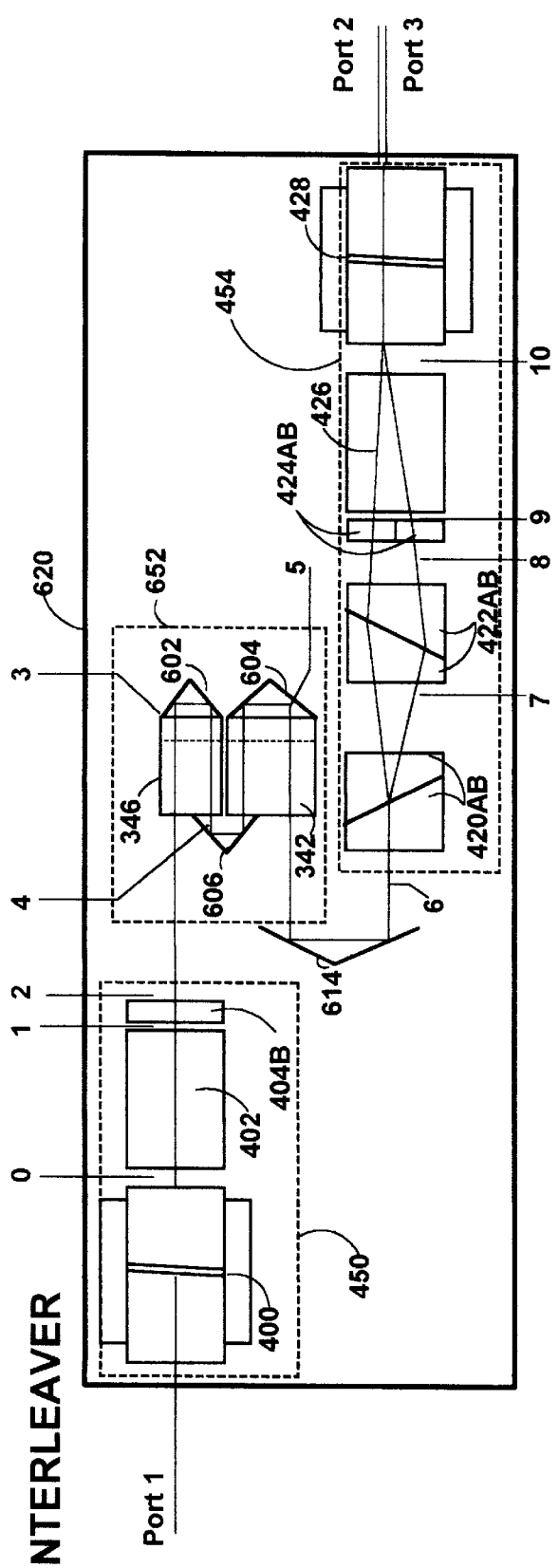
FIG. 6F shows polarization diagrams of light rays at various stages of the mux/demux shown in FIG. 6E.
Figure 6F:
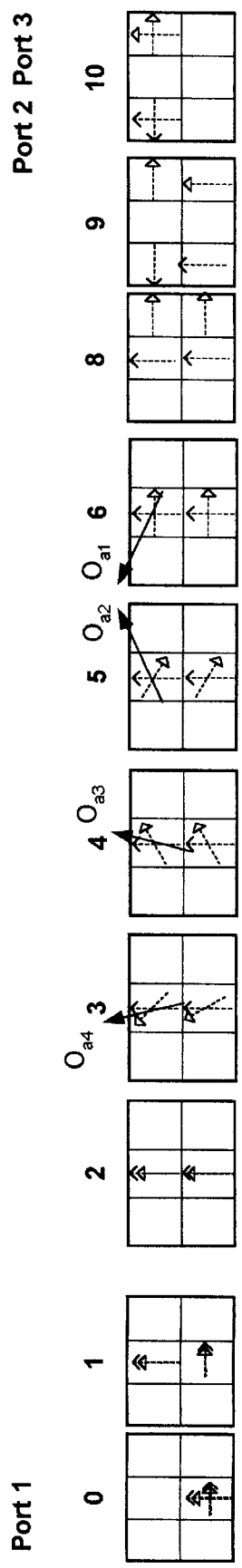

FIG. 6F shows polarization diagrams of light rays at various stages of the mux/demux shown in FIG. 6E.

Figure 7B:
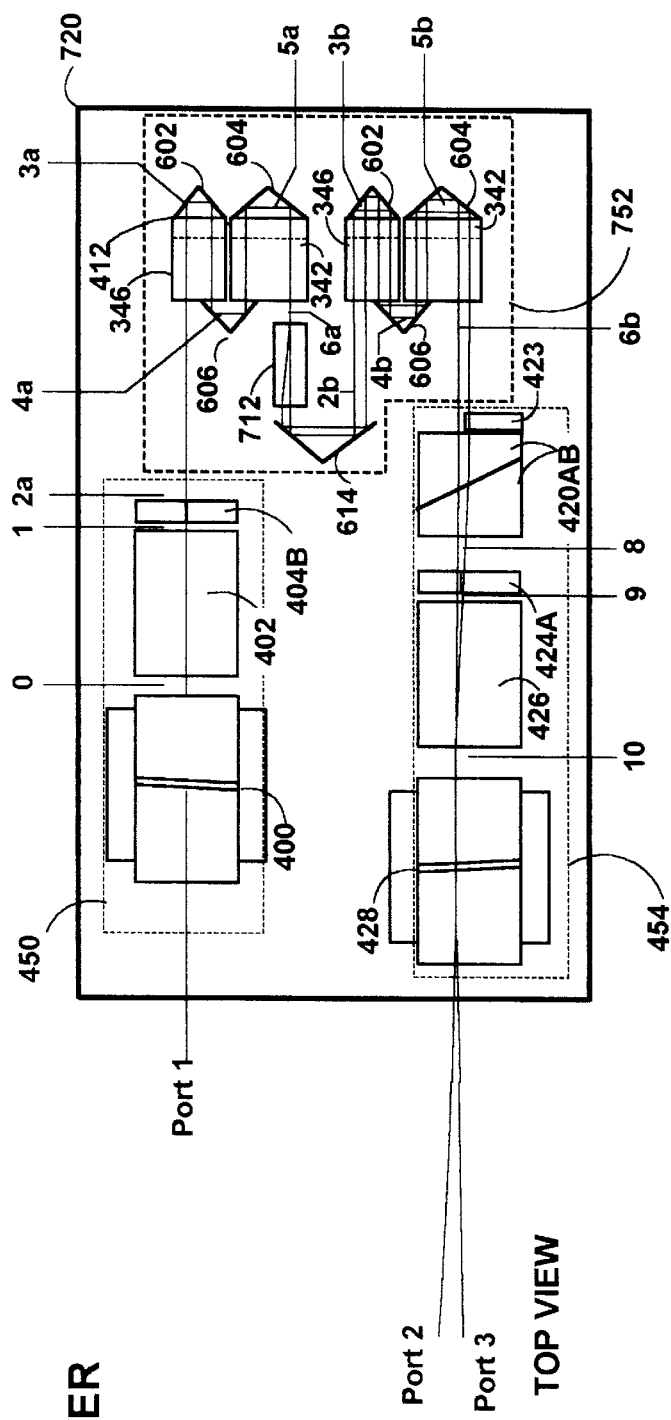
FIG. 7B shows polarization diagrams of light rays at various stages of the mux/demux shown in FIG. 7A.
Figure 7B:
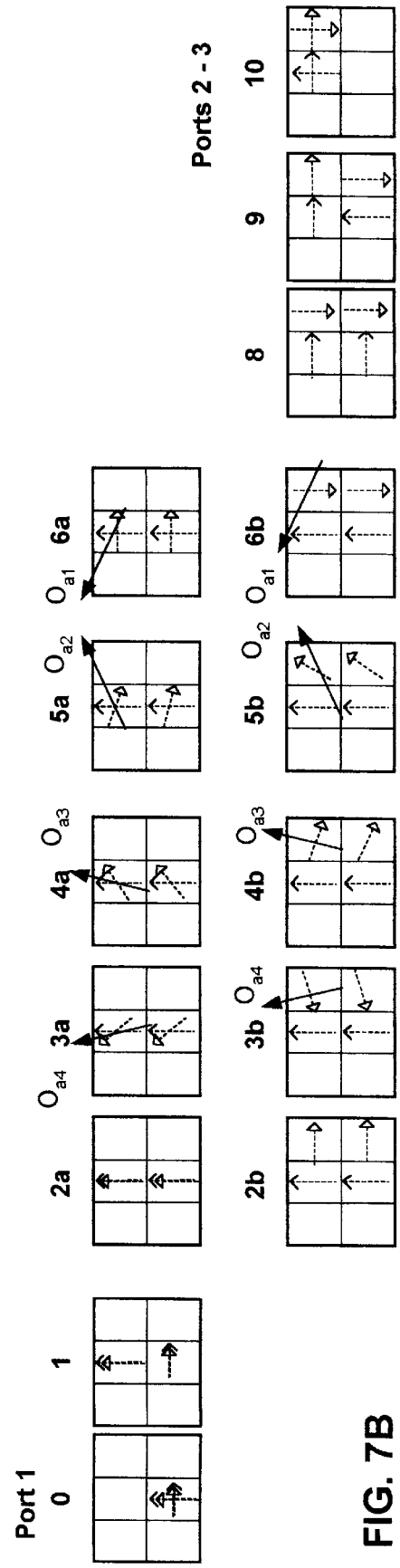

FIG. 7A is a top plan view of a mux/demux 720 which is an alternate embodiment of the mux/demux shown in FIG. 6E. The optical stack 752 uses two wave plate stacks each with folded propagation paths. Each is similar to that shown in FIGS. 6A and 6E. This staging increases isolation between odd and even channels. FIG. 7B shows polarization diagrams of light rays at various stages of the mux/demux shown in FIG. 7A. Light from port 1 is passed through linear polarizer 450 to the first I/O interface of the side-by-side stack composed of wave plates 342,346. Upon exiting this stack at the location referenced "6a" (See polarization diagram 6a), the odd and even components of each of the two rays have been orthogonalized. Next they pass through a beam splitter/combiner 712, e.g., a birefringent crystal oriented to walk off e- and o-rays. Then the component beams, which are now separate and orthogonal, are directed by retroreflector 614 back into the second stage of periodic filtering performed again by a second set of wave plates 342,346.

At interface 2b shown in polarization diagram "2b", odd channels are horizontally polarized with a small amount of even channel signals still remaining. During propagation through the second stage of periodic filters, the polarization direction of one of the odd/even channels will be rotated while the other of the odd/even channels will not be affected. This further improves isolation and reduces cross talk between channels. Light exits the second stage at the second I/O interface labeled 6b (See polarization diagram "6b") with odd and even components of both rays separated and linearly polarized. Those rays pass to beam displacer/combiner 454 for passage to ports 2–3. Since the component rays have already been separated by splitter/combiner 712, only a single beam bender 420A/B is required to orthogonally polarize the components of each ray. A polarization rotator 423 serves to rotate one pair of the component beams prior to entering the beam bender.

The end result of the above-discussed arrangement is improved channel isolation with reduced cross talk. As with all the embodiments discussed above, the operation of this embodiment as well may be reversed to serve as either a multiplexer, a de-multiplexer or a combined mux/demux.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An optical device for splitting/combining odd and even channels of an optical beam between a first port communicating odd and even channels and a second port communicating the odd channels together with a third port communicating the even channels, and adjacent orders of the odd and even channels evenly spaced apart and each centered on a corresponding gridline of a selected wavelength grid; and said optical device comprising;

a linear polarizer coupled to the first port for linearly polarizing optical signals;

a plurality of wave plates with a first and a second I/O interface, and the plurality of wave plates optically coupled at a first I/O interface to the linear polarizer, and the plurality of wave plates successively retarding the e-ray and o-ray components of a one of the odd channels and the even channels by integer multiples of $2\pi$ and of an other the odd channels and the even channels by odd integer multiples of $\pi$, both at a free spectral range corresponding to the spacing between gridlines of the selected wavelength grid, to rotate both odd and even channel components of an optical beam between a linear and an orthogonal relationship depending on the propagation direction, and each of the plurality of wave plates tuned to even symmetry with the selected wavelength grid; and a beam displacer/combiner, optically coupling the second I/O interface of the plurality of wave plates with both the second port and the third port, and the beam displacer/combiner displacing and combining orthogonally polarized odd and even channel components of an optical beam depending on a propagation direction.

2. The optical device of claim 1, wherein the linear polarizer further comprises:

a polarization beam splitter/combiner that splits an arbitrarily polarized optical beam into component beams with orthogonal polarization vectors and combines two component beams with orthogonal polarization vectors into the optical beam depending on the propagation direction; and a polarization rotator that rotates component beams with orthogonal polarization vectors into linear alignment and rotates linearly aligned polarization vectors into orthogonal polarization vectors depending on the propagation direction.

3. The optical device of claim 1, wherein the orientation of at least a selected one of the plurality of wave plates includes tilting of a normal to a surface of the selected one of the plurality of wave plates with respect to an optical path of the optical beam to provide tuning to even symmetry with the selected wavelength grid.

4. The optical device of claim 1, wherein a polarization vector of the optical beam at the first I/O interface defines the z axis of an x-y-z Cartesian coordinate system, with propagation of the optical beam along the y-axis and with the optical axis of successive ones of the plurality of wave plates substantially oriented at one of a positive angle and a negative angle Φn with respect to one of the y-axis and the x-axis, where the angle Φ1 about the y-axis corresponds with the orientation of the optical axis of a first of the plurality of wave plates with respect to the polarization vector and n is an integer corresponding to the relative ordering of each one of the plurality of wave plates.

5. The optical device of claim 4, wherein the optical axis of each successive one of the plurality of wave plates commencing with a first of the plurality of wave plates substantially exhibit the following cyclic relationship expressed as rotations of the successive optical axis of each successive one of the plurality of wave plates about the y axis:

a) the positive angle Φn about the z-axis followed by
b) the negative angle Φn about the z-axis, followed by
c) the positive angle Φn about the y-axis, followed by
d) the negative angle Φn about the y-axis; and again up to a last of the plurality of wave plates.

6. The optical device of claim 1, wherein the angular orientation $\Phi_n$ of an optical axis of an $n^{th}$ one of a total of N of the plurality of wave plates with respect to the input polarization vector corresponds with the following expression where N is the total number of the plurality of wave plates, n is an integer corresponding to the relative ordering of each one of the plurality of wave plates and i is an integer including zero;

$$\Phi_n = (-1)^n \left[ \frac{\pi}{4} \times \left\{ \left( n + \frac{1 + 3 \times ((-1)^n)}{2} \right) - \frac{2i+1}{N} \right\} \right].$$

7. An optical device for operating upon optical signals between a first port communicating odd channels and even channels and a second port communicating the odd channels together with a third port communicating the even channels, and adjacent orders of the odd and even channels evenly spaced apart and each centered on a corresponding gridline of a selected wavelength grid; and said optical device comprising;

a linear polarizer coupled to the first port for linearly polarizing optical signals;

a plurality of wave plates with a first and a second I/O interface, and the plurality of wave plates optically coupled at a first I/O interface to the linear polarizer, and the plurality of wave plates rotating both odd and even channel components of an optical beam between a linear and an orthogonal relationship depending on the propagation direction, and each of said plurality of wave plates having a selected length and a selected index of refraction determinative of a free spectral range corresponding to a spacing between adjacent gridlines of the selected wavelength grid, and each of the plurality of wave plates tuned to even symmetry with the selected wavelength grid; and wherein each of the plurality of wave plates operates as a half wave plate with respect to one of the odd channels and the even channels and a whole wave plate with respect to an other of the odd and the even channels; and a beam displacer/combiner, optically coupling the second I/O interface of the plurality of wave plates with both the second port and the third port, and the beam displacer/combiner displacing and combining orthogonally polarized odd and even channel components of an optical beam depending on a propagation direction.

8. The optical device of claim 7, wherein each of the plurality of wave plates further comprises:

at least one beam folder for reducing a number of the plurality of wave plates by folding a propagation path of the optical beam at least twice through at least a selected one of the plurality of wave plates.

9. The optical device of claim 8, wherein the propagation path includes opposing propagation directions through at least the selected one of the plurality of wave plates.

10. The optical device of claim 1, wherein each of the plurality of wave plates comprise a birefringent crystal.

11. The optical device of claim 10, wherein each of the plurality of wave plates include at least one of YVO4, LiNbO3, KTP, a-BBO, Calcite, Crystal Quartz and Rutile.

12. The optical device of claim 7, wherein the beam displacer combiner further comprises:

at least one beam angle turner optically coupled to the second I/O interface of the plurality of wave plates for tuning the odd and even channel components of an optical beam through an angle, wherein the path of the odd and even channel components converges or diverges depending upon the polarization direction of the odd and even channel components and the propagation direction;

a polarization rotator that rotates linearly aligned polarization vectors of the odd and even channel components into orthogonal polarization vectors and rotates odd and even channel components with orthogonal polarization vectors into linear alignment depending on the propagation direction; and a polarization beam splitter/combiner that combines separate odd and even channel components with orthogonal polarization vectors into the optical beam and splits an arbitrarily polarized optical beam into component beams with orthogonal polarization vectors depending on the propagation direction.

13. An optical telecommunications system comprising the optical device of claim 1.

14. The optical telecommunications system of claim 13, wherein the optical telecommunication system comprises at least one of, a wavelength division multiplexer, a wavelength division de-multiplexer, and an optical router.

15. A method for splitting/combining odd and even channels of an optical beam between a first port communicating odd channels and even channels and a second port communicating the odd channels together with a third port communicating the even channels, and adjacent orders of the odd and even channels evenly spaced apart and each centered on a corresponding gridline of a selected wavelength grid; and said method for splitting/combining comprising;

linearly polarizing the optical beam at the first port;

successively retarding the e-ray and o-ray components of a one of the odd channels and the even channels by integer multiples of 2π and of an other the odd channels and the even channels by odd integer multiples of π, both at a free spectral range corresponding to the spacing between gridlines of the selected wavelength grid, to rotate odd and even channel components of the optical beam between a linear and an orthogonal relationship depending on the propagation direction;

tuning the odd and even channels to even symmetry with the selected wavelength grid; and displacing and combining orthogonally polarized odd and even channel components of an optical beam depending on a propagation direction.

16. The method for splitting/combining of claim 15, wherein the act of linearly polarizing further comprises the acts of:

splitting an arbitrarily polarized optical beam into component beams with orthogonal polarization vectors and combining two component beams with orthogonal polarization vectors into the optical beam depending on the propagation direction; and rotating component beams with orthogonal polarization vectors into linear alignment and rotating linearly aligned polarization vectors into orthogonal polarization vectors depending on the propagation direction.

17. The method for splitting/combining of claim 15, wherein the act of successively retarding the e-ray and o-ray components further comprises the acts of:

orienting a polarization vector of the optical beam along the z-axis of an x-y-z Cartesian coordinate system with the optical beam propagating along the y-axis; and subjecting the propagating optical beam to successive optical axis substantially oriented at one of a positive angle and a negative angle Φn with respect to one of the y-axis and the x-axis, where the angle Φ1 about the y-axis corresponds with the orientation of a first of the optical axis with respect to the polarization vector and n is an integer corresponding to the relative ordering of each one of the plurality of optical axis.

18. The method for splitting/combining of claim 17, wherein the act of successively retarding the e-ray and o-ray components further comprises the acts of:

subjecting the optical beam to successive optical axis commencing with a first of the optical axis which substantially exhibit the following cyclic relationship expressed as rotations of the successive optical axis about the y-axis:

a) the positive angle Φn about the z-axis followed by
b) the negative angle Φn about the z-axis, followed by
c) the positive angle Φn about the y-axis, followed by
d) the negative angle Φn about the y-axis; and again up to a last of the optical axis.

19. The method for splitting/combining of claim 15, wherein the act of successively retarding the e-ray and o-ray components further comprises the acts of:

orienting a polarization vector of the optical beam along the z-axis of an x-y-z Cartesian coordinate system with the optical beam propagating along the y-axis; and subjecting the propagating optical beam to successive optical axis, wherein the angular orientation Φn of an $n^{th}$ one of the optical axes of a total of N optical axes along the optical beam path with respect to the input polarization vector corresponds with the following expression; where N is the total number of optical axes, n is an integer corresponding to the relative ordering of each one of the plurality of optical axes and i is an integer including zero;

$$\Phi_n = (-1)^n \left[ \frac{\pi}{4} \times \left\{ \left( n + \frac{1 + 3 \times ((-1)^n)}{2} \right) - \frac{2i+1}{N} \right\} \right].$$

20. The method for splitting/combining of claim 15, wherein the act of successively retarding the e-ray and o-ray components further comprises the acts of:

folding a propagation path of the optical beam at least twice across at least one of successive optical axes.

21. The method for splitting/combining of claim 20, wherein the act of folding further comprises the acts of:

folding along opposing propagation paths.

22. The method for splitting/combining of claim 15, wherein the displacing and combining acts further comprise the acts of:

turning the odd and even channel components of an optical beam through an angle, wherein the path of the odd and even channel components converge or diverge depending upon the polarization direction of the odd and even channel components and the propagation direction;

rotating linearly aligned polarization vectors of the odd and even channel components into orthogonal polarization vectors and rotating odd and even channel components with orthogonal polarization vectors into linear alignment depending on the propagation direction; and separating odd and even channel components with orthogonal polarization vectors into the optical beam and splitting an arbitrarily polarized optical beam into component beams with orthogonal polarization vectors depending on the propagation direction of the optical beam.

23. A means for splitting/combining odd and even channels of an optical beam between a first port communicating odd channels and even channels and a second port communicating the odd channels together with a third port communicating the even channels, and adjacent orders of the odd and even channels evenly spaced apart and each centered on a corresponding gridline of a selected wavelength grid; and said means for splitting/combining comprising;

means for linearly polarizing the optical beam at the first port;

means for successively retarding the e-ray and o-ray components of a one of the odd channels and the even channels by integer multiples of 2π and of an other the odd channels and the even channels by odd integer multiples of π, both at a free spectral range corresponding to the spacing between gridlines of the selected wavelength grid, to rotate odd and even channel components of the optical beam between a linear and an orthogonal relationship depending on the propagation direction;

means for tuning the odd and even channels to even symmetry with the selected wavelength grid; and means for displacing and combining orthogonally polarized odd and even channel components of an optical beam depending on a propagation direction.

24. The means for splitting/combining of claim 23, wherein the means for linearly polarizing further comprises:

means for splitting an arbitrarily polarized optical beam into component beams with orthogonal polarization vectors and combining two component beams with orthogonal polarization vectors into the optical beam depending on the propagation direction; and means for rotating component beams with orthogonal polarization vectors into linear alignment and rotating linearly aligned polarization vectors into orthogonal polarization vectors depending on the propagation direction.

25. The means for splitting/combining of claim 23, wherein the means for successively retarding the e-ray and o-ray components further comprises:

means for orienting a polarization vector of the optical beam along the z-axis of an x-y-z Cartesian coordinate system with the optical beam propagating along the y-axis; and means for subjecting the propagating optical beam to successive optical axis substantially oriented at one of a positive angle and a negative angle $\Phi_n$ with respect to one of the y-axis and the x-axis, where the angle $\Phi_1$ about the y-axis corresponds with the orientation of a first of the optical axis with respect to the polarization vector and n is an integer corresponding to the relative ordering of each one of the plurality of optical axis.

26. The means for splitting/combining of claim 25, wherein the means for successively retarding the e-ray and o-ray components further comprises:

means for subjecting the optical beam to successive optical axis commencing with a first of the optical axis which substantially exhibit the following cyclic relationship expressed as rotations of the successive optical axis about the y-axis:

a) the positive angle $\Phi_n$ about the z-axis followed by
b) the negative angle $\Phi_n$ about the z-axis, followed by
c) the positive angle $\Phi_n$ about the y-axis, followed by
d) the negative angle $\Phi_n$ about the y-axis; and again up to a last of the optical axis.

27. The means for splitting/combining of claim 23, wherein the means for successively retarding the e-ray and o-ray components further comprises:

means for orienting a polarization vector of the optical beam along the z-axis of an x-y-z Cartesian coordinate system with the optical beam propagating along the y-axis; and means for subjecting the propagating optical beam to successive optical axis, wherein the angular orientation $\Phi_n$ of an $n^{th}$ one of the optical axes of a total of N optical axes along the optical beam path with respect to the input polarization vector corresponds with the following expression; where N is the total number of optical axes, n is an integer corresponding to the relative ordering of each one of the plurality of optical axes and i is an integer including zero;

$$\Phi_n = (-1)^n \left[ \frac{\pi}{4} \times \left\{ \left( n + \frac{1 + 3 \times ((-1)^n)}{2} \right) - \frac{2i+1}{N} \right\} \right].$$

28. The means for splitting/combining of claim 23, wherein the means for successively retarding the e-ray and o-ray components further comprises:

means for folding a propagation path of the optical beam at least twice across at least one of successive optical axes.

29. The means for splitting/combining of claim 28, wherein the means for folding further comprises:

means for folding along opposing propagation paths.

30. The means for splitting/combining of claim 23, wherein the displacing and combining means further comprises:

means for turning the odd and even channel components of an optical beam through an angle, wherein the path of the odd and even channel components converge or diverge depending upon the polarization direction of the odd and even channel components and the propagation direction;

means for rotating linearly aligned polarization vectors of the odd and even channel components into orthogonal polarization vectors and rotating odd and even channel components with orthogonal polarization vectors into linear alignment depending on the propagation direction; and means for separating odd and even channel components with orthogonal polarization vectors into the optical beam and splitting an arbitrarily polarized optical beam into component beams with orthogonal polarization vectors depending on the propagation direction of the optical beam.

* * * * *